Jan. 29, 1935.  M. W. McCONKEY ET AL  1,989,207
BRAKE
Original Filed Nov. 4, 1927
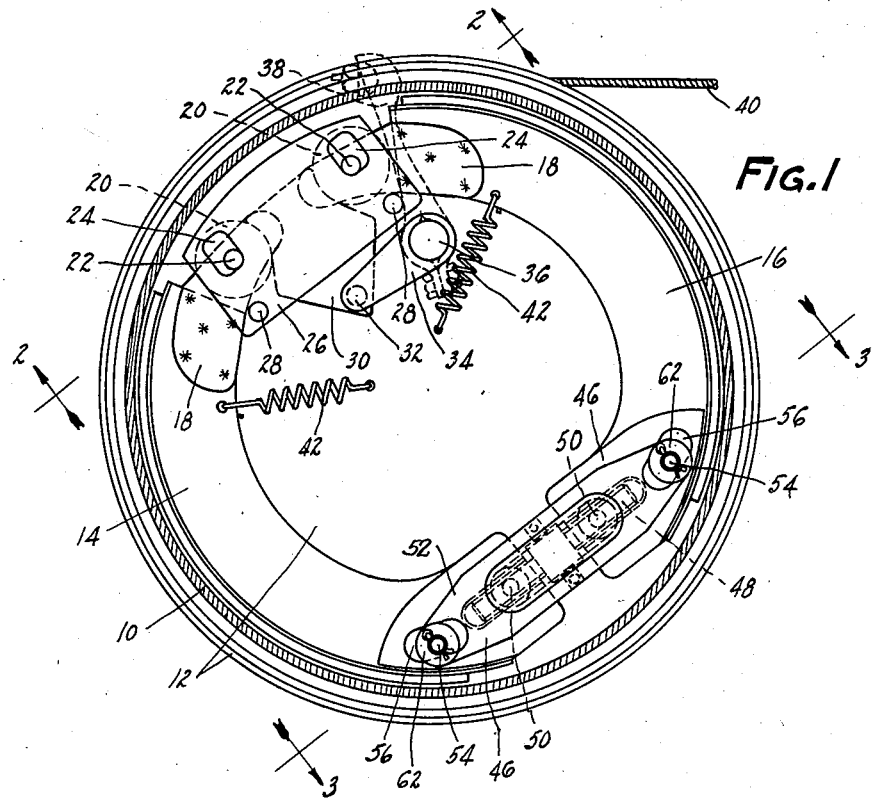
FIG.1
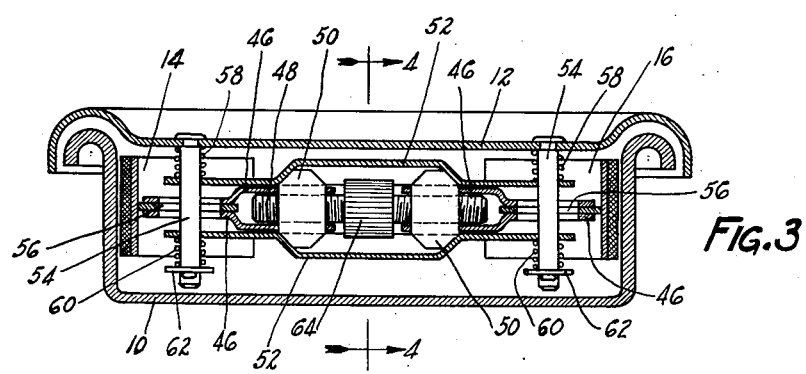
FIG.3
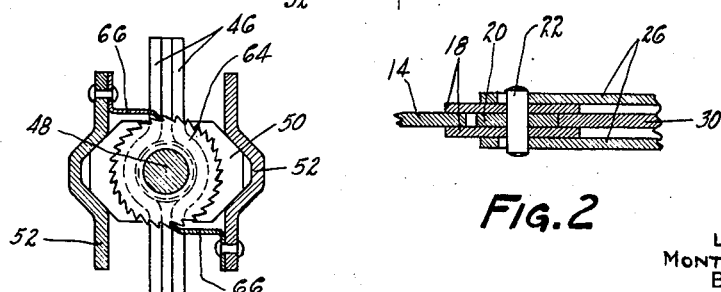
FIG.4
FIG.2
INVENTORS
LUDGER E. LA BRIE
MONTGOMERY W. McCONKEY
BY
*M. W. McConkey*
ATTORNEY Patented Jan. 29, 1935

1,989,207

UNITED STATES PATENT OFFICE 1,989,207

BRAKE

Montgomery W. McConkey and Ludger E. La Brie, South Bend, Ind., assignors to Bendix Brake Company, South Bend, Ind., a corporation of Illinois Application November 4, 1927, Serial No. 230,955
Renewed August 14, 1933

35 Claims. (Cl. 188—78)

This invention relates to brakes, and is illustrated as embodied in an internal expanding brake for an automobile. Most of the features of novelty are particularly useful in a brake of the type in which the friction means anchors differently in opposite directions of rotation of the brake drum, the brake selected for illustration in the drawing including a friction device anchoring at one end when the drum is turning in one direction and at the other end when the drum in turning in the other direction, and thus always being fully effective.

One important feature relates to preventing any possible shock when the brake takes hold, by predetermining the anchorage according to the direction of drum rotation prior to full engagement of the friction device with the drum. In one very effective arrangement, this is accomplished by moving one or both ends of the friction device initially against the drum, for example by shifting the entire friction device bodily toward the drum in the direction of the drum radius extending between the ends of the friction device. Thus, before the friction device really takes hold, the anchorage is definitely determined by the drum. In the illustrated brake, the proper one of the ends is held by the friction of the drum against its anchor, while the other is urged by the drum away from its anchor in the direction of applying the brake. After the anchorage is thus determined, i. e., after the first slight movement of the applying means, the ends of the friction device are forced in opposite directions to apply the brake. These two stages of brake application are not necessarily entirely distinct, although in the preferred mechanism the sequence of steps is quite definite.

Another important feature of novelty contemplates the automatic adjustment of the brake, by operating an expansible joint connecting two sections or shoes of the friction device, or an equivalent adjustment acting to increase the effective length of the friction device. In one desirable arrangement, there are two spring-held members arranged to operate the adjustment through means such as a novel pawl and ratchet mechanism, and which members are forced apart more or less, to render them operative, by the movement of the friction device when the brake is applied.

Other objects and features of the invention, including an improved connector at the end of the shoe, and other novel and desirable structural details, will be apparent from the following description of one illustrative embodiment shown in the accompanying drawing, in which:

Figure 1 is a vertical section through the brake, just inside the brake drum, and showing the brake shoes in side elevation;

Figure 2 is a partial section on the line 2—2 of the brake, and showing one of the anchorages;

Figure 3 is a section on the line 3—3 of Figure 1, showing the adjustment; and

Figure 4 is a section through the adjustment on the line 4—4 of Figure 3, and showing the pawl and ratchet means for automatically operating the adjustment.

In the arrangement selected for illustration, the brake includes a rotatable drum 10, at the open side of which is a support such as a pressed steel backing plate 12, and within which is arranged the friction means of the brake. The friction means of this particular brake includes a floating friction device anchoring differently in opposite directions of rotation of the drum 10, and preferably including a pair of brake shoes 14 and 16 connected by an adjustment in the form of a novel floating expansible joint described below. The shoes may be built up of steel stampings if desired, a flat web being welded at intervals along its outer edge to the inner face of a rim or band carrying the brake lining. The shoes 14 and 16 are preferably reversible and interchangeable.

At its upper end, each of the shoes 14 and 16 has plates 18 welded to opposite sides of its web, and projecting at the end of the shoe on opposite sides of a thrust roller 20. Roller 20 is mounted on a pivot pin 22 carried by plates 18, and projecting at its ends into anchor openings 24 in anchor plates 26 mounted on posts 28 carried by the backing plate 12. The friction device anchors on the pin 22 of shoe 14 when the drum is turning clockwise, and on the pin 22 of shoe 16 when it is turning counter-clockwise, and is thus fully effective in either direction of drum rotation.

In order to predetermine the proper anchorage, and to avoid any shifting of the anchorage when the brake is applied, novel applying means is provided, preferably effective in two stages at least partially distinct from one another: (1) to force the end of one or both of shoes 14 and 16 against the drum to select the anchorage, and then (2) to force the ends of these shoes in opposite directions to apply the brake. Among the many means suited to secure this action, we have selected for illustration a bodily movable cam or wedge 30 connected by a pivot 32 to a lever arm 34 on a rock shaft 36 operated by an arm 38 on the outside of the backing plate and operatively connected to a cable or link or other means 40 forming part of the brake-applying connections of the car.

Opposite edges of the member 30 engage the rollers 20 of the two ends of the friction device made up of shoes 14 and 16. Member 30 acts, in applying the brake, against return springs 42, which are inclined so that they not only urge the shoe ends toward each other away from the drum, but also urge the entire friction device bodily downward, in a direction parallel the drum radius between the two shoe ends.

Springs 42 are strong enough, and the slope of the edges of cam or wedge 30 is at such an angle, that when the brake is applied the initial movement of cam or wedge 30 moves the entire friction device 14—16 bodily upward, with both pins 22 in anchored position, until the upper ends of shoes 14 and 16 engage the drum. Thereupon, if the drum is turning clockwise, shoe 14 is held by the drum friction against its anchorage while shoe 16 is urged away from its anchorage, while if the drum is turning counterclockwise the shoe 16 is held against its anchorage and the shoe 14 is urged away from its anchorage.

When bodily movement of the friction device is arrested by the drum, further movement of the applying means acts to spread the shoes apart, without disturbing the anchorage of the selected shoe, fully to apply the brake.

The idle positions of the shoes, at their upper ends, is determined by springs 42 holding the pins 22 in the angles of openings 24 of the anchorages.

At its lower end, each of the shoes has, spot-welded on opposite sides of its stiffening web, stampings or plates 46, pressed out to form (with a slot cut in the end of the shoe web) a socket extending along a chord of the shoe, to receive one end of a right-and-left threaded adjusting member 48.

Opposite ends of the adjusting member 48 are threaded into cylindrical and conically-ended connectors or nuts 50, formed with threaded transverse openings for member 48, and mounted in alined circular openings in stampings or side plates 46. It will be seen that turning member 48 separates the shoe more or less to compensate for wear, thus providing a simple expansible joint connecting the shoes. Each shoe can pivot on its connector 50.

The conical ends of the connectors 50 project at opposite sides of the shoes into engagement with wedge surfaces on floating levers or adjusting plates 52. Plates 52 are slidably spring-held on posts 54 mounted on the backing plate 12 and passing through relatively large openings 56 in the brake shoes. Springs 58 sleeved on posts 54 are compressed between the backing plate 12 and one adjusting plate 52, while springs 60 are compressed between the other plate 52 and washers 62 held by cotter pins or the like on the ends of posts 54.

It will be seen that posts 54 and associated parts serve as steady rests holding the shoes laterally and yieldingly in proper position.

Adjusting member 48 is provided, at its center, with a ratchet portion 64 engaged by two spring pawls 66 carried by members 52. Ratchet 64 and pawls 66 constitute means for automatically adjusting the brake for wear.

If the drum is turning clockwise when the brake is applied, the connector 50 of shoe 14 will wedge the lefthand ends of members 52 (Figure 3) apart, causing them to fulcrum on their righthand ends; while if the drum is turning counterclockwise, the connector 50 of shoe 16 will wedge the righthand ends of members 52 apart while they fulcrum on their lefthand ends. In either case, the pawls 66 are separated against the resistance of one pair of springs 58—60.

If the brake has become unduly worn, this separation of pawls 66 will go far enough to permit them to snap over the next teeth of pawl 64. When this occurs, as soon as the brake is released, springs 58 and 60 force the members 52 toward each other, causing pawls 66 to turn member 48 the angular distance of one tooth, thus compensating for the wear.

It should be noted that the movement of the pawls 66, to make an adjustment may be quite large (i. e. $\frac{1}{16}$ to $\frac{1}{8}$ inch), whereas the separation of the shoes caused by turning member 48 one tooth is quite small (i. e. three to ten-thousandths of an inch). Thus the adjustment made at any one time is very fine, and will be very little affected by unusual temporary conditions, such as a high degree of expansion of the drum due to heat, as for example in descending a long hill.

While one embodiment has been described in detail, it is not our intention to limit the scope of the invention to that particular embodiment or otherwise than by the terms of the appended claims. The invention of the present application is junior to the invention of application by Roy S. Sanford, No. 499,683, filed Dec. 1, 1930, disclosing and claiming broadly a right-and-left threaded connecting member between the shoes, and it is not our intention to claim here any subject-matter disclosed therein.

We claim:

1. A brake comprising, in combination, a drum, a friction device engageable with the drum and shiftable to anchor at one end when the drum is turning in one direction and at the other end when the drum is turning in the other direction, applying means for the brake acting on said ends of the friction device, and means cooperating with the friction device and insuring that the applying means will act in applying the brake first to force at least one of said ends against the drum to predetermine the anchorage and thereafter to force said ends in opposite directions to apply the brake.

2. A brake comprising, in combination, a drum, a friction device having adjacent ends engageable with the drum and arranged to anchor at one point when the drum is turning in one direction and at a different point when the drum is turning in the other direction, applying means for the brake acting on said ends of the friction device, and means cooperating with the friction device and insuring that the applying means will act in applying the brake first to force both the ends of said device against the drum to predetermine the anchorage and thereafter to force said ends in opposite directions to apply the brake.

3. A brake comprising, in combination, a drum, a floating expansible friction device within the drum having adjacent relatively-movable ends, anchorage means taking the braking torque when the brake is applied from one part of said device when the drum is turning in one direction and from another part of said device when the drum is turning in the other direction, applying means acting on said ends and means for causing the applying means to act in two stages which are at least partially distinct and which comprise (1) forcing at least one of saids ends against the drum without disengaging the anchoring means and to predetermine the anchorage and (2) forcing the ends apart to apply the brake.

4. A brake comprising, in combination, a drum, a floating expansible friction device within the drum having adjacent relatively-movable ends, anchorage means taking the braking torque when the brake is applied from one of said ends when the drum is turning in one direction and from the other of said ends when the drum is turning in the other direction, applying means acting on said ends, and means causing the applying means to act in two stages which are at least partially distinct and which comprise (1) forcing both of said ends against the drum without disengaging the anchoring means and to predetermine the anchorage and (2) forcing the ends apart to apply the brake.

5. A brake comprising, in combination, a drum, a floating expansible friction device within the drum having adjacent separable ends and which anchors differently in opposite directions of drum rotation, applying means acting on the friction device, and means causing the applying means to act in two stages which are at least partially distinct and which comprise (1) shifting at least a part of the friction device to engage the drum in the direction of the drum radius passing between said ends and then (2) forcing said ends apart.

6. A brake comprising, in combination, a drum, a floating expansible friction device within the drum having adjacent separable ends and which anchors differently in opposite directions of drum rotation, applying means shifting the friction device bodily toward the drum in the direction of the drum radius passing between said ends and also forcing said ends apart, and means for preventing separating movement of said ends until engagement of the drum therewith.

7. A brake comprising, in combination, a drum, a floating expansible friction device having adjacent separable ends and anchoring differently according to the direction of drum rotation, means urging the friction device bodily in a direction moving said ends inwardly away from the drum parallel to the drum radius extending between said ends as well as urging them toward each other away from the drum, and an applying device arranged to shift the friction device bodily in opposition to said means to move said ends toward the drum and also arranged to force said ends apart to expand the friction device, said first means acting to prevent separating movement of said ends until engagement of the drum therewith.

8. A brake comprising, in combination, a drum, a floating expansible friction device having adjacent separable ends and anchoring differently according to the direction of drum rotation, means urging the friction device bodily in a direction moving said ends inwardly away from the drum parallel to the drum radius extending between said ends, and an applying device arranged to shift the friction device bodily in opposition to said means to move at least one of said ends toward the drum and also arranged to force said ends apart to expand the friction device.

9. A brake comprising, in combination, a drum, a floating expansible friction device within the drum having adjacent separable ends and which anchors differently in opposite directions of drum rotation, and applying means acting in two stages which are at least partially distinct and which comprise (1) shifting the friction device bodily toward the drum in the direction of the drum radius passing between said ends and then (2) forcing said ends apart, together with a floating expansible joint substantially opposite the applying means for forcing apart two portions of the friction device to compensate for wear.

10. A brake comprising, in combination, a drum, a floating expansible friction device having adjacent separable ends and anchoring differently according to the direction of drum rotation, means urging the friction device bodily in a direction moving said ends inwardly away from the drum parallel to the drum radius extending between said ends as well as urging them toward each other away from the drum, and an applying device arranged to shift the friction device bodily in opposition to said means to move said ends toward the drum without disengaging the anchoring means of either end and also arranged to force said ends apart to expand the friction device, together with a floating expansible joint substantially opposite the applying means for forcing apart two portions of the friction device to compensate for wear.

11. A brake comprising, in combination, a drum, a floating expansible friction device within the drum having adjacent separable ends and which anchors differently in opposite directions of drum rotation, applying means acting on said ends, and means causing the applying means to act in two stages which are at least partially distinct and which comprise (1) shifting the friction device bodily toward the drum in the direction of the drum radius passing between said ends and then (2) forcing said ends apart, together with a spring centering device acting on the friction device substantially opposite the applying means.

12. A brake comprising, in combination, a drum, a floating expansible friction device having adjacent separable ends and anchoring differently according to the direction of drum rotation, means urging the friction device bodily in a direction moving said ends inwardly away from the drum parallel to the drum radius extending between said ends as well as urging them toward each other away from the drum, and an applying device arranged to shift the friction device bodily in opposition to said means to move said ends toward the drum and also arranged to force said ends apart to expand the friction device, together with a spring centering device acting on the friction device substantially opposite the applying means.

13. A brake comprising, in combination, a drum, a floating friction device within the drum movable bodily without disengaging the anchors and anchoring when the brake is applied at one point when the drum is turning in one direction and at a different point when the drum is turning in the other direction, said friction device including an adjustment to compensate for wear by increasing the effective length of the friction device, and means operable in either direction of rotation of the drum automatically to operate said adjustment as the brake wears and which means is operated by applying and releasing the brake.

14. A brake comprising, in combination, a drum, a floating friction device within the drum shiftable bodily without disengaging the anchors and anchoring when the brake is applied at one point when the drum is turning in one direction and at a different point when the drum is turning in the other direction, said friction device including an adjustment to compensate for wear by increasing the effective length of the friction device, and means operable in either direction of rotation of the drum automatically to operate said adjustment as the brake wears.

15. A brake comprising, in combination, a drum, a floating friction device including a plurality of sections, anchors for the device, means to move the device bodily against the drum without disengaging the anchors and to force the sections against the drum and a floating expansible joint between said sections, and means automatically operated in either direction of rotation of the drum to expand said joint from time to time to compensate for wear of the brake.

16. A brake comprising, in combination, a drum, a floating friction device including a plurality of sections and a floating expansible joint between said sections, means automatically operated to expand said joint from time to time to compensate for wear of the brake, and spring means forming part of said expanding means and also acting to center the friction device when the brake is released.

17. A brake comprising, in combination, a drum, a friction device engageable with the drum and which includes an adjustment for increasing the effective length of the friction device to compensate for wear, a pair of operating members on opposite sides of the friction device adjacent said adjustment, springs resisting separation of said members, means carried by the friction device for forcing said members apart more or less against the resistance of said springs according to the extent of movement of the friction device, and means for operating the adjustment and which means is operated by the forcing together of said members by the springs after separation beyond a predetermined limit during application of the brake.

18. A brake comprising, in combination, a drum, a friction device engageable with the drum and which includes an adjustment for increasing the effective length of the friction device to compensate for wear, a ratchet arranged to operate the adjustment, a pair of operating members on opposite sides of the friction device adjacent said adjustment, springs resisting separation of said members, means carried by the friction device for forcing said members apart more or less against the resistance of said springs according to the extent of movement of the friction device, and a pawl device for operating the adjustment and which device is carried by at least one of said members.

19. A brake including a pair of shoes having threaded members pivotally mounted at their adjacent ends, and an automatically-actuated connecting member formed in one rigid piece and having right-and-left threaded ends in engagement with said members respectively and forming a floating articulating joint connecting the shoes.

20. An arcuate stamped brake shoe having at its end separately-formed plates pressed to form a substantially cylindrical socket extending approximately along a chord of the shoe curvature, in combination with a generally cylindrical connector extending crosswise of said socket, the connector having a transverse threaded opening normally coaxial with respect to the socket.

21. A brake including a shoe having a web comprising separately-formed pieces of material secured together in the web of the shoe and spread to provide separated portions at the end of the shoe and having a transverse pivot journaled in said separated portions.

22. A brake including a shoe having a web comprising separately-formed pieces of material secured together in the web of the shoe and spread to provide separated portions at the end of the shoe, and having a transverse pivot journaled in said separated portions and said pivot having a threaded opening between said portions.

23. A brake comprising a shoe having a web provided with stampings secured to its sides and formed at the end of the shoe to provide a socket in said end, said sides being apertured near their end to receive a trunnion.

24. A brake comprising a pair of shoes having a right-and-left threaded connection therebetween and which has an operating part at its center formed with peripheral teeth, and means for normally yieldingly locking the connection in adjusted position including a plate bridging across said ends and having a pawl part interlocking with said teeth.

25. A brake comprising a pair of shoes having a connection therebetween and which has an operating part at its center formed with peripheral teeth, and means for normally yieldingly locking the connection in adjusted position including a plate bridging across said ends and having a pawl part interlocking with said teeth.

26. A brake comprising a pair of shoes with pivots at their adjacent ends and with a connecting member between said pivots, and a plate engaging said pivots adjacent its ends and having means engaging and yieldingly locking said connecting member.

27. A brake comprising a pair of shoes having at their ends movable parts formed with sockets and having a rigid adjustable connecting member having its ends received in said sockets respectively, and a plate paralleling said connecting member and extending alongside the ends of the shoes and across the space between the shoes and which has means engaging and yieldingly locking said connecting member.

28. A brake comprising a pair of shoes having a connecting member between their ends, and a pair of plates having the ends of the shoes arranged between them, and each extending alongside the ends of the shoes and across the space between the shoes and each of which has means engaging and yieldingly locking said connecting member.

29. A brake comprising a pair of shoes, each having at its end a movable member having a socket, an adjusting member received in said sockets, and a plate extending alongside the ends of the shoes and across the space between the shoes and yieldingly locking said adjusting member.

30. A brake comprising a backing plate and friction means movable relatively thereto, and which means has an adjusting member movable with said means and formed with wide peripheral teeth, and a part held by the backing plate against movement with said means but having movement perpendicular to the plane of the backing plate and which has an operating pawl engaging said teeth.

31. A brake comprising a backing plate and friction means movable relatively thereto, and which means has an adjusting member movable with said means and formed with wide peripheral teeth, and a part held by the backing plate against movement with said means and which has an operating pawl engaging said teeth.

32. A brake comprising two floating shoes connected by a right-and-left threaded adjusting member floating with the shoes and having a central collar with peripheral teeth, and means for operating said member having a pawl engaging said teeth.

33. A brake comprising two floating shoes connected by an adjusting member floating with the shoes and having a central collar with peripheral teeth, and means including a part engaging said collar and movable in a direction perpendicular to the plane of the brake for operating said member.

34. A brake comprising two floating shoes connected by an adjusting member floating with the shoes and having a central collar with peripheral teeth, and means engaging said collar without interfering with lengthwise movement of said member with the shoes as they shift when the brake is applied, and which means is movable for operating said member.

35. A brake comprising a pair of shoes having a floating connection therebetween and which has an operating part at its center formed with relatively wide peripheral teeth, and means for adjusting said connection including a part engaging but not floating with said teeth and with respect to which the teeth shift lengthwise without disengagement therefrom and without being actuated thereby when the brake is applied.

LUDGER E. LA BRIE.
MONTGOMERY W. McCONKEY.